July 1, 1947.  M. A. CROSBY  2,423,138

WIRE COVERED BELT

Filed March 8, 1943

INVENTOR
MELVIN A. CROSBY
BY
Toulmin & Toulmin
ATTORNEY

Patented July 1, 1947

2,423,138

UNITED STATES PATENT OFFICE 2,423,138

WIRE COVERED BELT

Melvin A. Crosby, Dayton, Ohio, assignor to The Dayton Rubber Manufacturing Company, Dayton, Ohio, a corporation of Ohio Application March 8, 1943, Serial No. 478,431

10 Claims. (Cl. 74—233)

This invention deals with belts and more particularly refers to an improved V-type belt and the method for its manufacture.

Belts of the general type with which this invention is concerned comprises a tension section, a neutral axis section, and a compression section. They may be of the raw edge type or of the wrapped type, and in either case may include reinforcing members consisting of metal and/or fabric and may include one or more types of rubber composition in the several sections.

Hitherto V-type belts have generally included a plurality of parallelly disposed fabric cords lying along the longitudinal axis of the belt within the neutral axis section. More recently, fine wires or cables have been used in place of fabric cords, and in certain instances the neutral axis section has comprised a belt of metal of suitable characteristics to permit flexing of the belt and adapted to adhere firmly to the rubber composition forming the body of the belt.

The present invention is particularly concerned with an improved type of V-belt in which the body of the belt is reinforced by winding at least one strand of wire or cable helically around the body of the belt prior to vulcanization of the built-up belt body. Such a belt is characterized by long life in service, high resistance to wear along the sides in contact with the sheaves or pulleys, and high flexibility or bendability.

The nature of the present invention will be fully understood by reference to the annexed drawing, in which.

Figure 1:
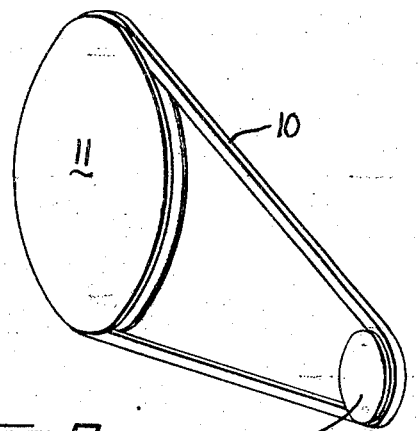
Fig. 1 is a diagrammatic illustration of the belt of the present invention as applied in a single belt drive.
Figure 2:
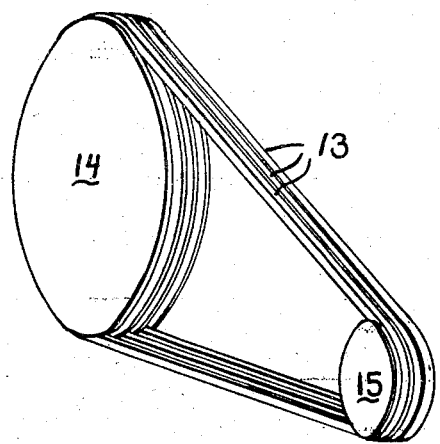
Fig. 2 is a diagrammatic illustration of the belt of the present invention as applied in a multiple belt drive.

Referring to Fig. 1, 10 is a belt passing over pulleys 11 and 12 to form a single belt drive, while in Fig. 2, 13 represents a plurality of belts passing over the pulleys 14 and 15 to produce a multiple belt drive.

Figure 3:
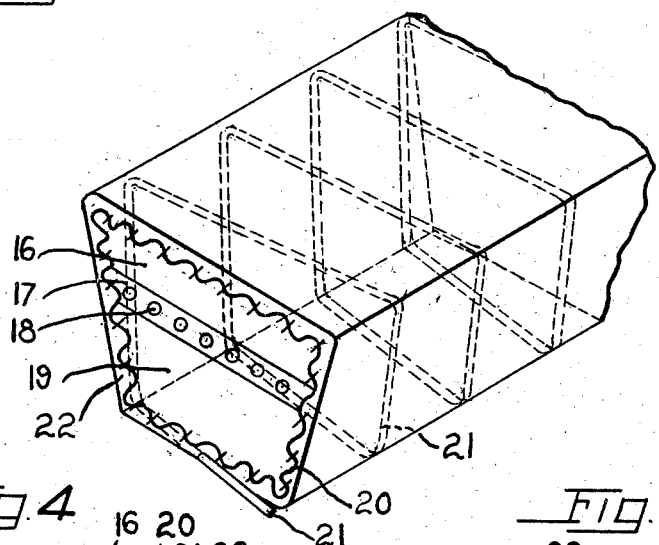
Fig. 3 is a diagrammatic perspective view showing the essential elements of the belt of the present invention.

Referring now to Fig. 3, 16 is the tension section of the belt, 17 is the neutral axis section including a plurality of cords 18, and 19 is the compression section of the belt. A fabric layer or breaker strip 20 surrounds the tension, neutral axis and compression sections of the belt and thereover is wound helically one or more wires or cables 21. The breaker strip 20 is preferably of open weave so that during vulcanization of the belt body a portion of the rubber composition comprising the several sections of the belt exudes through the breaker strip to form an outside coating 22 in which the wire 21 becomes embedded.

Figure 4:
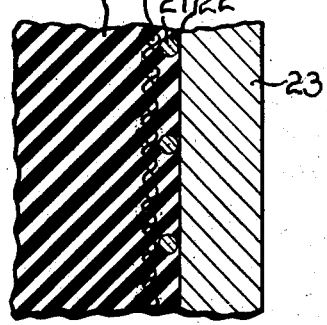
Fig. 4 is a fragmentary cross sectional plan view of the belt of the present invention as it lies against the side wall of a V-pulley.

In Fig. 4, 16 is the tension section of the belt, 20 is the breaker strip, 21 is the wrapped wire, 22 is the outer coating of rubber in which the wire 21 is embedded, and 23 is the V-pulley over which the belt is running.

Figure 5:
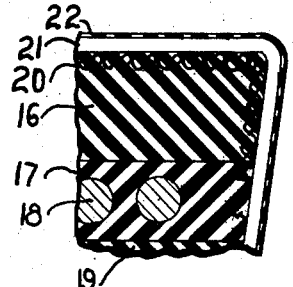
Fig. 5 is a fragmentary view of the belt illustrating the relative location of the several elements thereof.

In Fig. 5, 19 is the compression section, 17 is the neutral axis section including a plurality of cords 18, 16 is the tension section, 20 is the breaker strip, 21 is the wire wound around the body of the belt, and 22 is the outside coating of rubber composition.

In making the belt of the present invention, the several layers comprising the compression, neutral axis and tension sections are positioned one upon the other in the usual manner and wrapped in the breaker strip 20. One or more wires or cables 21 are then wound helically around the built-up body of the belt, and when this operation is completed the wire wrapped built-up body is subjected to a pressure and heat cure to shape and vulcanize it into a unitary article of the desired cross section. While the built-up body is under pressure and heat, rubber composition from the compression, neutral axis and tension sections will exude through the breaker strip 20 and will form an outside coating of rubber 22 in which the wire 21 will become embedded.

The belt which results from this process possesses certain definite advantages. It is highly resistant to abrasion because of the metal wire lying adjacent its outer surface, but nevertheless, it retains extreme flexibility because this metal wire is helically wound around the body of the belt and thus permits flexing of the belt.

As will be noted from Fig. 4 in the drawing, the face of the pulley 23 is in contact with the outer coating of rubber 22. As the belt wears down in use, the coating of rubber 22 will diminish in thickness and eventually the face of the pulley 23 will come into contact with the wire 21 which is wrapped around the belt. Thereafter the rate of wear will decrease in view of the fact that the metal wire 21 does not wear as rapidly as the rubber coating 22, but nevertheless there will remain a frictional engaging surface of rubber in contact with the face of the pulley 23 between the several loops of the wire 21.

Those skilled in the art will understand that the cords 18 in the neutral axis section 17 of the belt may comprise fine strands of wire or cables which may or may not have been treated to increase their adhesive properties with respect to rubber, or they may comprise textile or mineral fiber cords such as cotton, rayon, glass, etc.

The several sections of the belt may or may not be made of rubber composition including fiber reinforcement. For example, the compression section may be made of "Stiflex" which is a trade name for rubber composition reinforced with fine textile fibers which lie parallel to each other. If "Stiflex" or any other similar fiber reinforced composition is employed it is advantageous to have the fibers lying transverse of the longitudinal axis of the belt, the reason for this being that this tends to give the belt lateral incompressibility without reducing the flexibility of the belt.

It will be understood by those skilled in the art that while there has been illustrated in Fig. 4 of the annexed drawing a belt having a single breaker strip and a single strand of wire wrapped around it, this is not intended as a limitation. It will be obvious to those skilled in the art that several strands of wire could be used in place of the single strand of wire illustrated and that several layers of breaker strip material could be employed in place of the single layer illustrated. Likewise, those skilled in the art will understand that several layers of cords could be employed in the neutral axis section of the belt in place of the single layer of cord illustrated in the drawing.

The purpose of the breaker strip 20 illustrated in the drawing is to prevent undue penetration of the wire wrapped around the belt. It will be obvious that the breaker strip is not absolutely necessary and particularly so when wire of large diameter is employed; however, in some instances, and particularly where fine wire or cable is employed, it is advantageous to make use of a breaker strip.

While I have described herein and illustrated in the annexed drawing certain particular embodiments of the belt of the present invention, it will be understood that I do not intend to have my invention limited to or circumscribed by the specific details of construction, arrangement of parts, procedures, or products herein referred to or illustrated in the drawing in view of the fact that this invention is susceptible to changes according to individual preference and conditions without departing from the spirit of this disclosure and the scope of the appended claims.

I claim:

1. As a new article of manufacture, a belt comprising tension, neutral axis and compression sections, a woven fabric breaker strip surrounding these sections, and at least one strand of wire wrapped thereover.

2. As a new article of manufacture, a belt comprising tension, neutral axis and compression sections, a woven fabric breaker strip surrounding these sections, and at least one strand of wire helically wrapped thereover.

3. As a new article of manufacture, a belt comprising tension, neutral axis and compression sections of rubber composition, a breaker strip surrounding these sections, and at least one strand of wire wrapped thereover.

4. As a new article of manufacture, a belt comprising tension, neutral axis and compression sections of rubber composition, a breaker strip surrounding these sections, and at least one strand of wire helically wrapped thereover.

5. As a new article of manufacture, a belt comprising tension, neutral axis and compression sections, a woven fabric breaker strip surrounding these sections, and at least one strand of wire wrapped thereover, said neutral axis section comprising a plurality of cords lying parallel to each other and along the longitudinal axis of the belt.

6. As a new article of manufacture, a belt comprising tension, neutral axis and compression sections, a woven fabric breaker strip surrounding these sections, and at least one strand of wire helically wrapped thereover, said neutral axis section comprising a plurality of cords lying parallel to each other and along the longitudinal axis of the belt.

7. As a new article of manufacture, a belt of rubber composition comprising tension, neutral axis and compression sections and having at least one strand of wire wrapped around the belt, said strand of wire being surrounded by a thin layer of said rubber composition, said neutral axis section comprising a plurality of cords lying parallel to each other and along the longitudinal axis of the belt.

8. As a new article of manufacture, a belt of rubber composition comprising tension, neutral axis and compression sections a breaker strip surrounding these sections, and at least one strand of wire wrapped thereover, said strand of wire being surrounded by a thin layer of said rubber composition, said neutral axis section comprising a plurality of cords lying parallel to each other and along the longitudinal axis of the belt.

9. As a new article of manufacture, a belt of rubber composition comprising tension, neutral axis and compression sections and having at least one strand of wire helically wrapped thereover, said strands of wire being surrounded by a thin layer of said rubber composition, said neutral axis section comprising a plurality of cords lying parallel to each other and along the longitudinal axis of the belt.

10. As a new article of manufacture, a belt of rubber composition comprising tension, neutral axis and compression sections, a breaker strip surrounding these sections, and at least one strand of wire helically wrapped thereover, said strands of wire being surrounded by a thin layer of said rubber composition, said neutral axis section comprising a plurality of cords lying parallel to each other and along the longitudinal axis of the belt.

MELVIN A. CROSBY.

REFERENCES CITED

The following references are of record in the file of this patent:

UNITED STATES PATENTS

| Number | Name | Date |
| --- | --- | --- |
| 1,113,438 | Hess | Oct. 13, 1914 |
| 1,442,924 | Carlisle | Jan. 23, 1923 |
| 2,016,973 | Pistili | Oct. 8, 1935 |
| 2,199,529 | Shackelford | May 7, 1940 |
| 398,431 | Midgley | Feb. 26, 1889 |
| 2,336,149 | Freedlander | Dec. 7, 1943 |
| 1,970,509 | De Wein et al. | Aug. 14, 1934 |
| 254,089 | Briggs | Feb. 21, 1882 |
| 2,054,619 | Freedlander | Sept. 15, 1936 |

FOREIGN PATENTS

| Number | Country | Date |
| --- | --- | --- |
| 36,568 | Germany | Aug. 17, 1886 |
| 86,451 | Austria | Apr. 15, 1921 |